United States Patent
Yang et al.

(10) Patent No.: US 9,431,906 B2
(45) Date of Patent: Aug. 30, 2016

(54) VOLTAGE CONVERTER CIRCUIT AND ASSOCIATED CONTROL METHOD TO IMPROVE TRANSIENT PERFORMANCE

(71) Applicant: Chengdu Monolithic Power Systems Co., Ltd., Chengdu (CN)

(72) Inventors: Bo Yang, Allen, TX (US); Xiaoyu Xi, Plano, TX (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 580 days.

(21) Appl. No.: 13/853,986

(22) Filed: Mar. 29, 2013

(65) Prior Publication Data

US 2014/0292299 A1   Oct. 2, 2014

(51) Int. Cl.
*H02M 3/158* (2006.01)
*H02M 3/156* (2006.01)
*H02M 1/00* (2006.01)

(52) U.S. Cl.
CPC .......... *H02M 3/1588* (2013.01); *H02M 3/156* (2013.01); *H02M 2001/0003* (2013.01); *Y02B 70/1466* (2013.01)

(58) Field of Classification Search
CPC ... H02M 3/156; H02M 3/158; H02M 3/1588
USPC .......................................... 323/282–285, 288
See application file for complete search history.

(56) References Cited

U.S. PATENT DOCUMENTS

| | | | | |
|---|---|---|---|---|
| 5,490,055 | A * | 2/1996 | Boylan | H02M 3/156 323/285 |
| 6,894,471 | B2 * | 5/2005 | Corva | H02M 3/156 323/282 |
| 7,202,640 | B2 * | 4/2007 | Morita | H02M 1/4225 323/205 |
| 7,489,119 | B2 * | 2/2009 | Smith, Jr. | H02M 3/157 323/283 |
| 8,288,953 | B1 * | 10/2012 | Mei | H05B 33/0815 315/209 R |
| 2002/0057125 | A1 * | 5/2002 | Demizu | H02M 3/156 327/538 |
| 2008/0024100 | A1 * | 1/2008 | Huang | H02M 3/158 323/282 |
| 2010/0072964 | A1 * | 3/2010 | Qiu | H02M 3/156 323/282 |
| 2011/0149614 | A1 * | 6/2011 | Stracquadaini | H02M 3/33507 363/21.12 |
| 2012/0206121 | A1 * | 8/2012 | Evans | H02M 3/156 323/288 |
| 2013/0002223 | A1 | 1/2013 | Xi | |
| 2013/0009617 | A1 | 1/2013 | Xi | |
| 2013/0241511 | A1 | 9/2013 | Xi | |
| 2014/0125302 | A1 | 5/2014 | Yang et al. | |

* cited by examiner

*Primary Examiner* — Jessica Han
*Assistant Examiner* — David A. Singh
(74) *Attorney, Agent, or Firm* — Perkins Coie LLP

(57) ABSTRACT

A converter circuit has an error amplifier to provide an error signal; a proportional amplifier to provide a gain signal according the error signal and an output voltage of the converter circuit; a first comparator, generating a pulse signal according to the gain signal and a comparison signal; and a timer, generating a timing signal according to the pulse signal to indicate the on time and the off time of the converter circuit; and wherein either the gain signal or the comparison signal comprises a ramp component, and wherein the on time of the converter circuit is constant.

22 Claims, 9 Drawing Sheets

VOLTAGE CONVERTER CIRCUIT AND ASSOCIATED CONTROL METHOD TO IMPROVE TRANSIENT PERFORMANCE

TECHNICAL FIELD

The present invention generally relates to power circuit, and more particularly but not exclusively relates to voltage converter circuit and associated control method.

BACKGROUND

Switch mode power supply is widely employed in modern electrical products. Traditional switch mode power supply may apply pulse width modulation (PWM) control method to regulate the output of the power supply, which usually involves in complicated structure and slow transient response. Therefore, its performance in high current applications is limited.

Compared with PWM control method, pulse frequency modulation (PFM) control method, which primarily comprises constant on-time control method, constant off-time control method and hysteresis control method, possesses advantages in transient response performance and circuit design. FIG. 1 illustrates a prior art constant on-time converter circuit 10. Constant on-time converter circuit 10 primarily comprises a direct current to direct current (DC-DC) buck converter 101, and a controller 102. In the controller 102, an error signal VEAO is compared with a ramp signal VRAMP by a comparator 105. Wherein, VEAO is generated by an operational transconductance amplifier 104 according to a difference between a reference signal VREF and an output voltage feedback signal VFB. When the ramp signal VRAMP falls lower than the error signal VEAO, a pulse is provided to an on-timer 103 so that on-timer 103 turns a primary switch M1 on and turns a synchronous switch M2 off. After a constant period T1 passes, on-timer 103 turns off the primary switch M1 and turns on the synchronous switch M2. With the complementary actions of switches M1 and M2, an output voltage VOUT is generated from an input voltage VIN.

When a transient load step occurs, the error signal VEAO may react smoothly. To achieve fast transient response for the converter circuit 10, the peak to peak amplitude of the ramp signal VRAMP should be very small. But the small ramp amplitude may cause two major problems. First, it means that the noise margin of the converter circuit 10 is relatively small. When the converter circuit 10 is operating in a noisy operation environment, this feature may lead to a big risk. Second, to cope with small amplitude signal, circuit elements such as comparators need draw more power to achieve desired speed.

BRIEF DESCRIPTION OF THE DRAWINGS

Non-limiting and non-exhaustive embodiments are described with reference to the following drawings. The drawings are only for illustration purpose. These drawings are not necessarily drawn to scale. The relative sizes of elements illustrated by the drawings may differ from the relative size depicted.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present technology may be practiced without these specific details. In other instances, well-known methods, procedures, components, and circuits have not been described in detail so as not to unnecessarily obscure aspects of the present invention.

The term "on time" hereby and in the following text indicates in a converter circuit, the duration of a primary switch (high side switch in certain embodiments) turning on within per operational cycle. The term "off-time" hereby and in the following text indicates the duration of the primary switch turning off within per single operational cycle.

Figure 1:
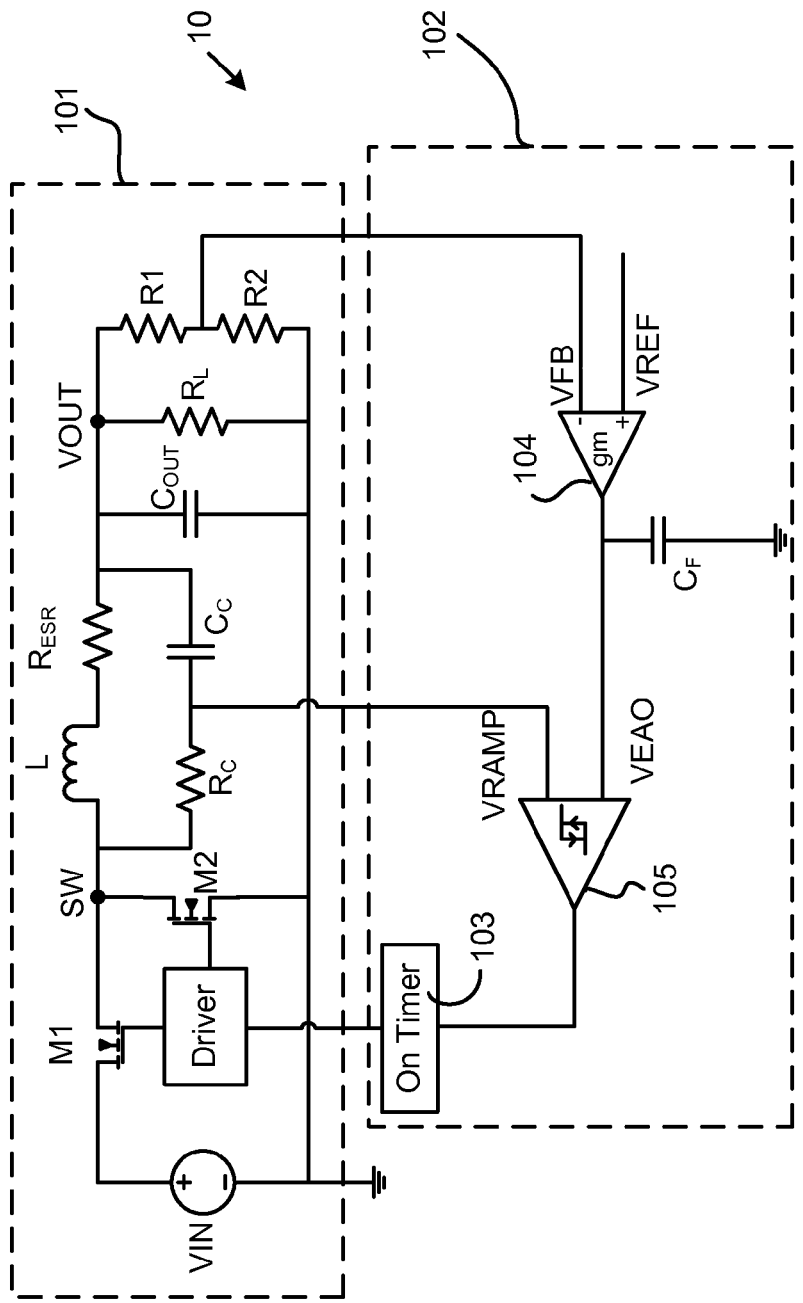
FIG. 1 illustrates a schematic circuit diagram of a prior art converter circuit 10.
Figure 2:
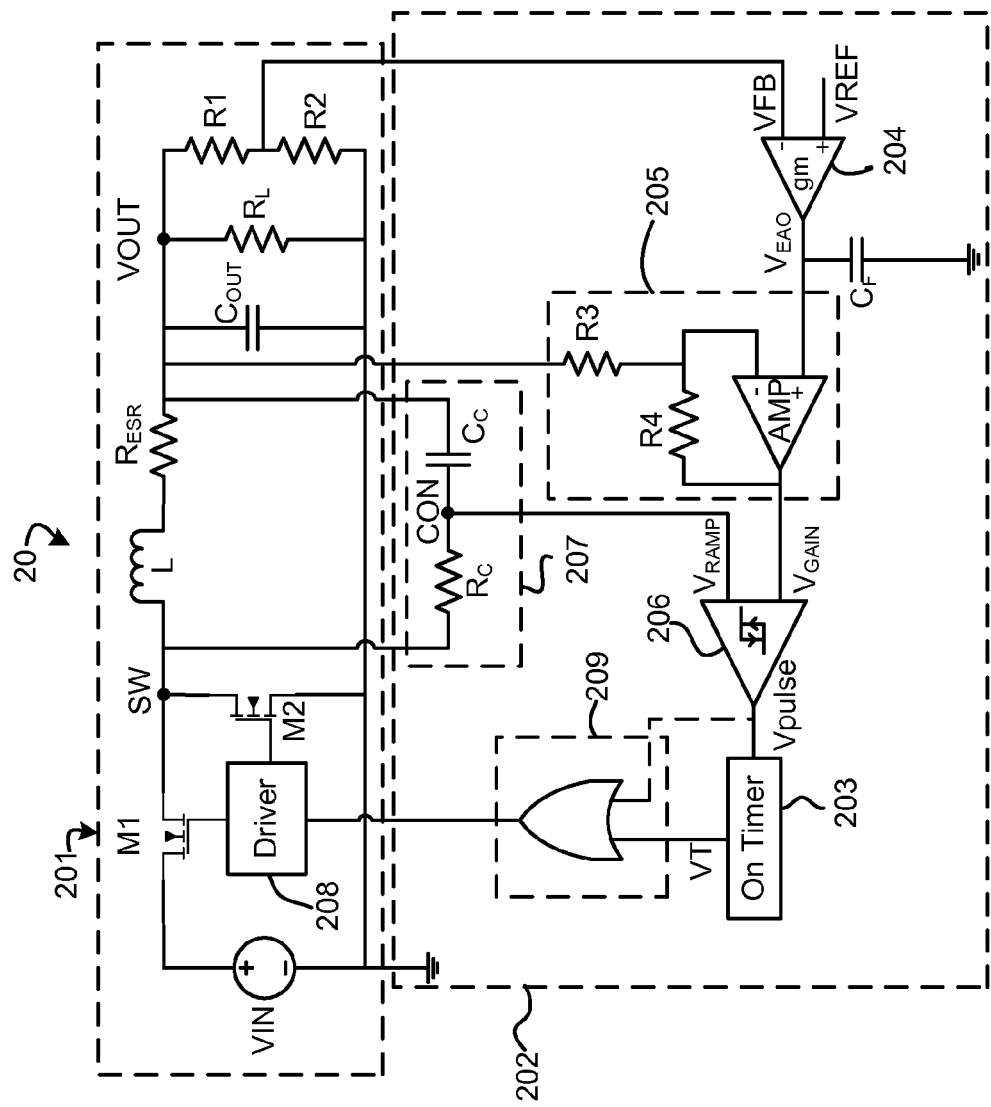
FIG. 2 illustrates a schematic circuit diagram of a converter circuit 20 according to an embodiment of the present invention.

FIG. 2 illustrates a schematic circuit diagram of a converter circuit 20 according to an embodiment of the present invention. As shown in FIG. 2, the converter circuit 20 primarily comprises a voltage converter 201 and a controller 202. In certain embodiments, voltage converter 201 is a switch mode converter. For example, in the embodiment shown in FIG. 2, the voltage converter 201 is a DC-DC buck converter. Other types of converter, such as boost converter, buck-boost converter, fly-back converter, or any other suitable converter that is known by the ordinary artisan, may also be applied as the switch mode converter. The switch mode converter 201 at least comprises a high side switch M1, and in certain embodiments further comprises a low side switch M2. It is well-known by the ordinary artisan that the low side switch M2 may also be replaced by a free-wheel diode in other embodiments. A driver circuit 208 is coupled to the switches M1 and M2, configured to drive switches M1 and M2 according to the output of controller 202. A conjunction node of switches M1 and M2 is defined as switch node SW. An output inductor L, a resistor RESR, and an output capacitor COUT together comprise a filter circuit of the switch-mode converter 201, wherein RESR is the practical equivalent series resistor of the ideal output capacitor COUT. A feedback loop comprising resistors R1 and R2 detects an output voltage VOUT on an output node OUT, and configured to generate a feedback signal FB.

Continuing seen in FIG. 2, in one embodiment, controller 202 comprises a timer 203, an error amplifier 204, a proportional amplifier circuit 205, and a first comparator 206. In the illustrated embodiment, the error amplifier 204 is an operation transconductance amplifier (OTA). The OTA 204 comprises a non-inverting input end, an inverting input end and an output end, wherein the non-inverting input end is coupled to a reference signal VREF, and wherein the inverting input end is coupled to the feedback signal FB. A capacitor CF is coupled between the output end of the OTA 204 and a reference ground. Thus, an error signal VEAO is generated on the output end of OTA 204. Proportional amplifier circuit 205 has two inputs and an output, wherein the two inputs respectively receive the output voltage VOUT and the error signal VEAO, and wherein the output generates a gain signal VGAIN accordingly. In one embodiment, the proportional amplifier circuit 205 comprises an operation amplifier AMP, a first resistor R3 and a second resistor R4. The operation amplifier AMP has a first input, a second input and an output, wherein the first input is coupled to the output end of the OTA 204, and wherein the output is coupled to the first comparator 206. The first resistor R3 is coupled to the output voltage VOUT with one terminal and coupled to the second input end of the operation amplifier with the other terminal. The second resistor R4 is coupled between the second input of the operation amplifier AMP and the output of the operation amplifier AMP. Resistors R3 and R4 are configured to decide the magnification factor of proportional amplifier circuit 205. One with ordinary skill in relevant art should note that in other embodiments, other well known circuit structures may also be utilized as proportional amplifier 205. First comparator 206 has two inputs and an output, wherein the two inputs respectively receive the gain signal VGAIN and a comparison signal, and wherein the output generates a pulse signal Vpulse accordingly. When the comparison signal is smaller than the gain signal VGAIN, a pulse is generated on the pulse signal Vpulse. One feature of the illustrated embodiment is that at least either the gain signal VGAIN or the comparison signal comprises a ramp component. For example, in the embodiment illustrated in FIG. 2, the comparison signal is a ramp signal VRAMP generated by a ramp network 207. In one embodiment, ramp network 207 is coupled with the output inductor L of the converter circuit in parallel. The ramp network 207 may comprise a resistor Rc and a capacitor Cc, wherein the resistor Rc and the capacitor Cc are in series coupled. The ramp signal VRAMP is generated on a conjunction node CON of the resistor Rc and the capacitor Cc. In other embodiments, ramp network 207 may alternatively comprise other suitable circuitry structures and connection relationships. For example, the ramp network 207 may be coupled to the node OUT to receive the output voltage VOUT only; or the ramp network 207 may further comprises a voltage divider to provide a divided output voltage VOUT to the capacitor Cc rather than to directly couple the output voltage VOUT to the capacitor Cc. Timer 203 has an input and an output, wherein the input is coupled to the output of the first comparator 206, and wherein the output generates a timing signal VT to indicate the on-time and the off-time of the converter circuit. In one embodiment, the output of timer 203 serves as the output of controller 202 and the timing signal VT controls at least the high side switch M1 via the driver circuit 208. In the illustrated embodiment, the timing signal VT further controls the low side switch M2. The high switch M1 and the low side switch M2 are turned on complementarily. Once a pulse is generated on the pulse signal Vpulse, the timing signal VT steps up to turn on the primary switch M1 and to turn off the synchronous switch M2. Meanwhile timer 203 begins timing. After a constant time TON, the timing signal VT flops to low level to turn off the high side switch M1 and to turn on the low side switch M2.

In another embodiment, the controller 202 further comprises an optional OR gate 209 (depicted in area enclosed by the dash line). OR gate 209 has two inputs and an output, and wherein the two inputs respectively receive the timing signal VT and the pulse signal Vpulse, and wherein the output serves as the output of controller 202, and is coupled to and controls at least the high side switch M1 via the driver circuit 208. The output of OR gate 209 may be further coupled to and controls the low side switch M2 via the driver circuit 208 in certain embodiments. Once a pulse is generated on the Vpulse, the high side switch M1 may be turned on immediately, which may avoid the propagation delay caused by the timer 203 and thus may obtain a better transient response performance. Also, as long as output of the comparator 206 is high, the high side switch M1 will keep on, which may extend on time in case of heavy load step-up.

Figure 3:
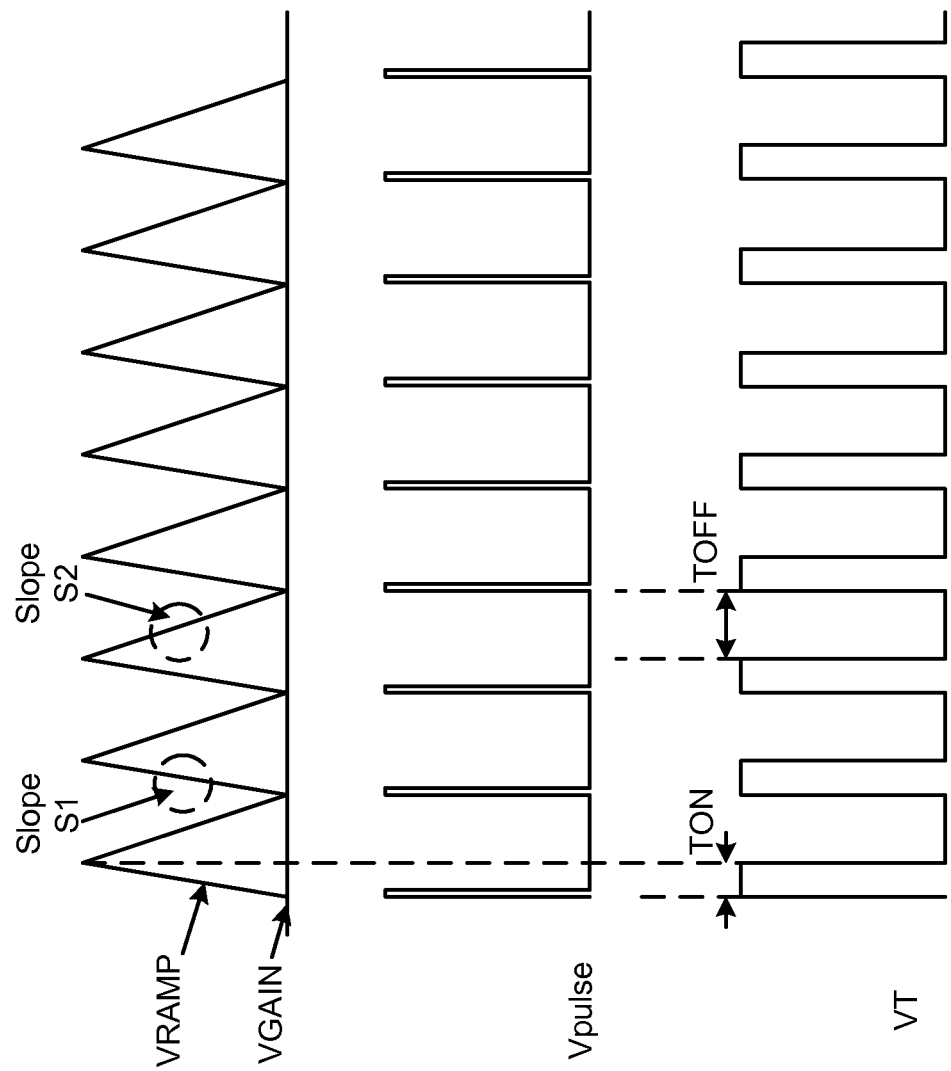
FIG. 3 illustrates an operational wave form diagram of converter circuit 20 according to one embodiment of the present invention.

FIG. 3 illustrates an operational wave form diagram of converter circuit 20 according to one embodiment of the present invention. According to FIG. 2 and FIG. 3, the operational principle of converter circuit 20 is described in the following text.

Seen in FIG. 3, converter circuit 20 is operating in steady state. The error signal VEAO generated by OTA 204 is a function of feedback signal FB and the reference signal VREF (e.g. 0.8V). Specifically, the error signal $$VEAO = (VREF - VFB)\frac{gm}{\omega CF} \quad (1)$$

Wherein, gm is the transconductance of OTA 204, ω is the switching angular velocity, and wherein ω=2π×fsw, and fsw is the switching frequency of high side switch M1.

Proportional amplifier circuit 205 receives the error signal VEAO and the output voltage VOUT. Due to the proportional amplifying effect of resistors R3 and R4, $$\frac{VGAIN - VEAO}{R4} = \frac{VEAO - VOUT}{R3} \quad (2)$$

Therefore, $$VGAIN = -\frac{R4}{R3}VOUT + \frac{R3 + R4}{R3}VEAO \quad (3)$$

In steady state, the error signal VEAO is nearly constant. The variation of gain signal VGAIN may be considered a function of the output voltage VOUT. Consequently, by properly setting the values of resistors R3 and R4, the gain signal VGAIN may be very sensitive to the change on the output voltage VOUT.

Meanwhile, in the illustrated embodiment, ramp network 207 is coupled in parallel with the output inductor L to obtain the ramp signal VRAMP. When the high side switch M1 is turned on, the voltage level on node SW nearly equals VIN. For a buck converter, VIN>VOUT. At this time, the capacitor Cc is charged and the voltage level of ramp signal VRAMP rises with a slope S1. After the constant on time TON, the ramp signal VRAMP reaches its peak value. The ramp amplitude of the ramp signal is:

$$VRAMP = \frac{TON}{RcCc}(VIN - VOUT) \quad (4)$$

Then, the timer 203 stops timing. The high side switch M1 is turned off, and the low side switch M2 is turned on. The voltage level on node SW falls down to near ground voltage. The capacitor Cc is discharged and the voltage level of the ramp signal VRAMP declines with a slope S2.

Whenever the voltage level of the ramp signal VRAMP equals to the gain signal VGAIN, a pulse is generated on the pulse signal Vpulse. This pulse is delivered to the timer 203 to begin timing for a next round. The high side switch M1 is turned on again and the low side switch M2 is turn off. Consequently the converter circuit 20 enters the next operation cycle.

Figure 4:
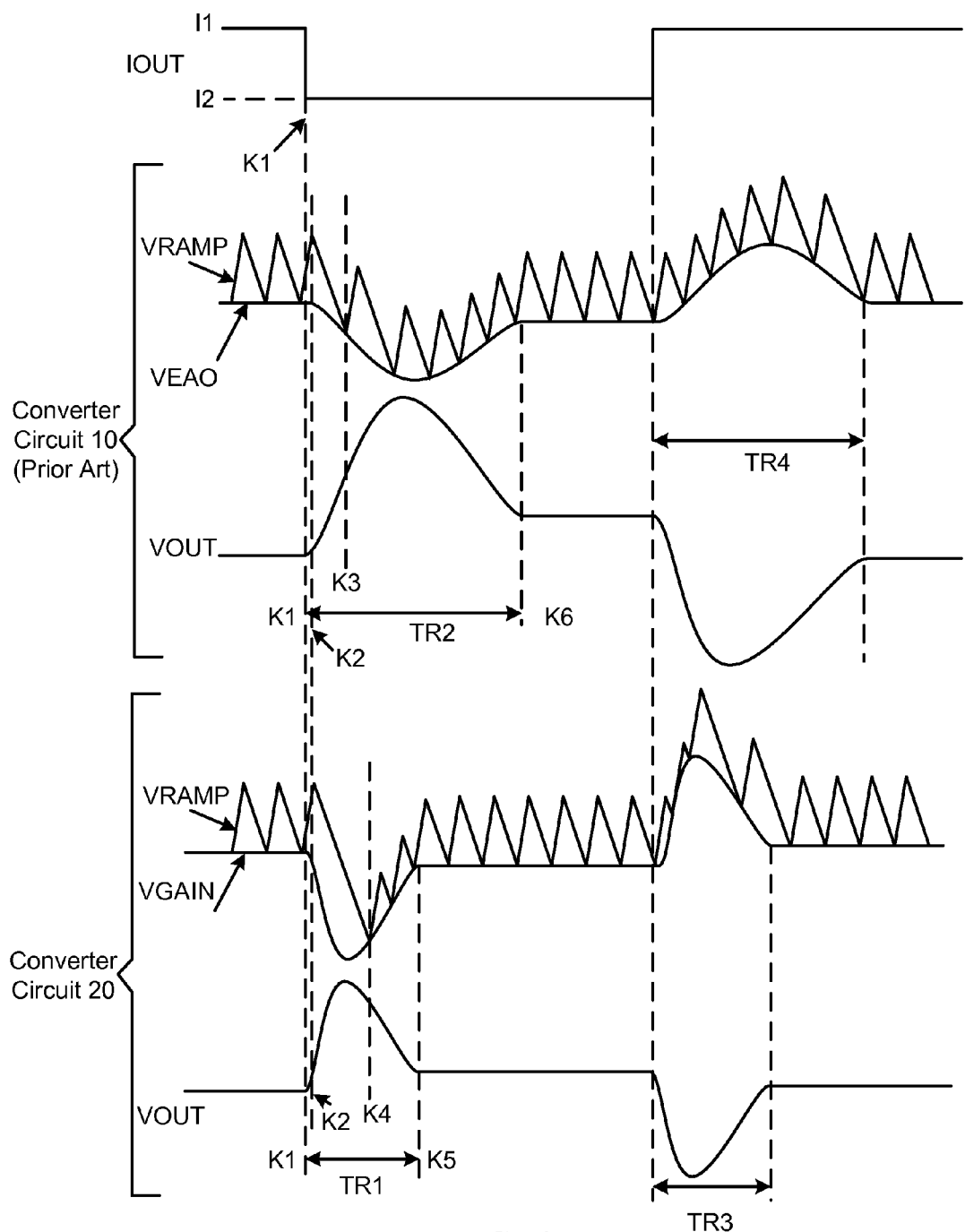
FIG. 4 illustrates an operational wave form diagram of a transient response comparison between the converter circuit 20 and the prior art converter circuit 10 according to an embodiment of the present invention.

FIG. 4 illustrates an operational wave form diagram of a transient response comparison between the converter circuit 20 and the prior art converter circuit 10 according to an embodiment of the present invention. As shown in FIG. 4, a large amplitude ramp component is applied in the ramp signal VRAMP. At steady state (before moment K1), the load current IOUT is maintained at I1. At moment K1, the load current IOUT steps down from I1 to I2. The output voltage VOUT immediately responses from load current IOUT and drastically rises up. For the converter circuit 20, in response of the rising of output voltage VOUT, the gain signal VGAIN proportionally declines down according to formula (3). Whereas, for the prior art converter circuit 10, due to the limited conductance gm, and the delay effect of the capacitor CF, the response of error signal VEAO is relatively slow. At moment K2, the on-time of this operational cycle ends, and the ramp signal VRAMP drops down with the slope S2. Because of the quick and drastic response of VGAIN, the ramp signal VRAMP touches the gain signal VGAIN much later than the error signal VEAO. As a result, the prior art converter circuit 10 enters into the next operation cycle at moment K3, while the converter circuit 20 according to an embodiment of the present invention enters into the next operation cycle at moment K4, wherein the moment K4 is much later than the moment K3, which means that the output voltage VOUT on converter circuit 20 may stop rising earlier than it on the prior art converter circuit 10. Continuously seen in FIG. 4, at moment K4, the output voltage VOUT on converter circuit 20 has already declined from the peak value. While the output voltage VOUT on the prior art converter circuit 10 is still rising up. Moreover, after moment K4, by the effect of proportional amplifier circuit 205, the gain signal VGAIN also rises up in proportional to the output voltage VOUT. When the ramp signal VRAMP declines with the slope S2, it quickly touches the gain signal VGAIN again, Thus more pulses may be generated on the pulse signal Vpulse within per unit time, so that it may take shorter time for the output voltage VOUT on converter circuit 20 to return to normal. Seen in FIG. 4, at moment K5, the output voltage VOUT of converter circuit 20 according to the present embodiment is completely recovered, and a total recovery time of load step-up for converter circuit 20 is defined as TR1. Whereas, until moment K6, the output voltage VOUT of prior art converter circuit 10 is completely recovered and the total recovery time of load step-up for converter circuit 10 is defined as TR2. Wherein, TR1 is much shorter than TR2.

Continuing with FIG. 4, similarly with the load step-down transient response process described above, once the load current IOUT steps up from I2 to I1, the output voltage VOUT on the converter circuit 20 may also stop declining earlier and quickly return to normal value inasmuch as the gain signal VGAIN declines down and rises up drastically. The recovery time of load step-up TR3 for converter circuit 20 may be also much shorter than the recovery time of load step-up TR4 for prior art converter circuit 10.

Therefore, the above analysis indicates that compared with prior art converter circuit 10, the converter circuit 20 according to an embodiment of the present invention may obtain a better transient response performance when a large amplitude ramp component is applied.

Figure 5:
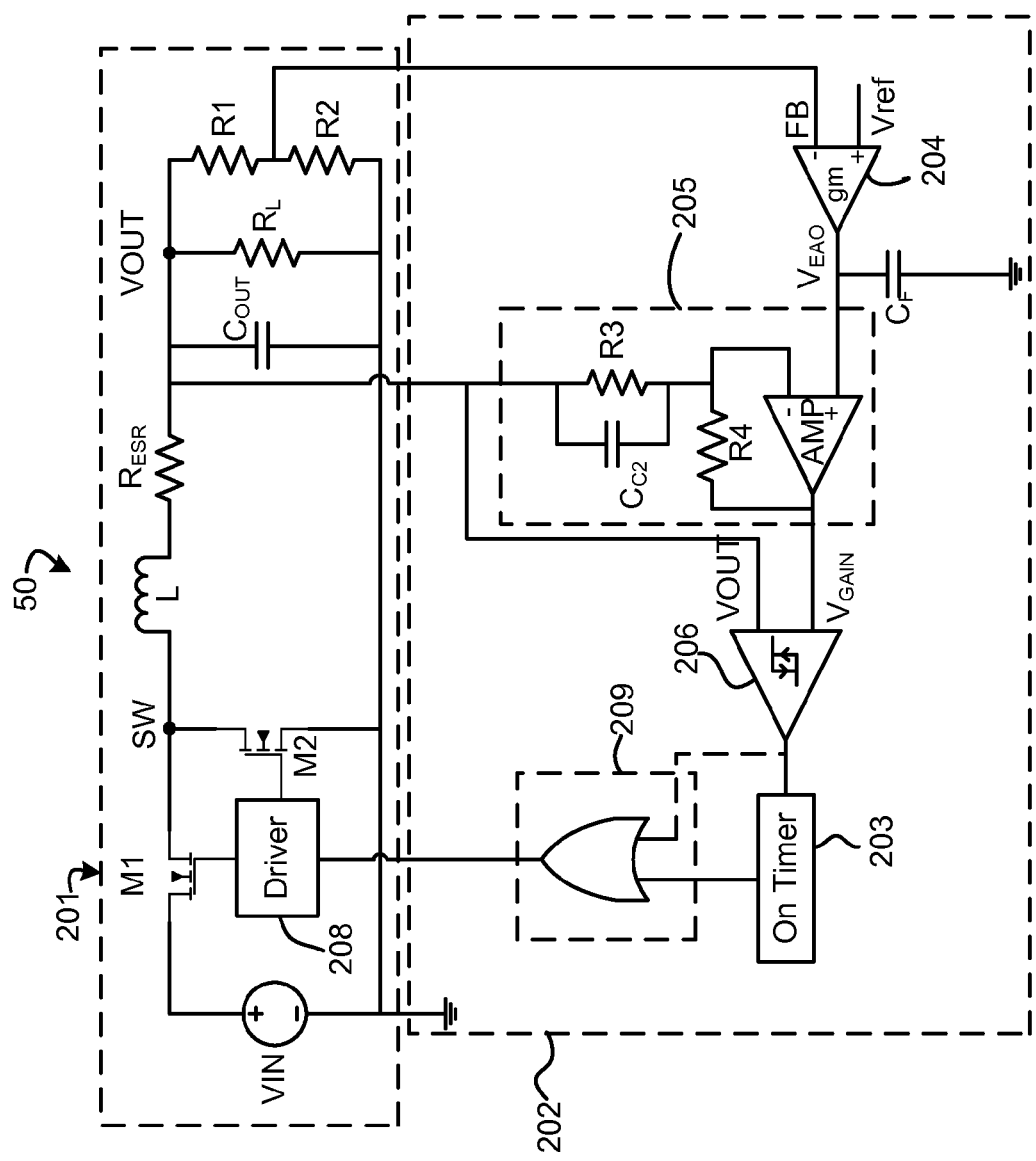
FIG. 5 illustrates a schematic circuit diagram of a converter circuit 50 according to another embodiment of the present invention.

FIG. 5 illustrates a converter circuit 50 according to another embodiment of the present invention. Converter circuit 50 has elements similar to converter circuit 20 in FIG. 2. For ease of illustration, the detailed information of the similar elements will not be described.

In the embodiment shown in FIG. 5, the output voltage VOUT is applied as the comparison signal instead of the ramp signal VRAMP. Therefore, the ramp network 207 is omitted. First comparator 206 compares the output voltage VOUT with the gain signal VGAIN. Meanwhile, in proportional amplifier circuit 205, a capacitor Cc2 is coupled with the resistor R3 in parallel, configured to generate a ramp component on the gain signal VGAIN.

Figure 6:
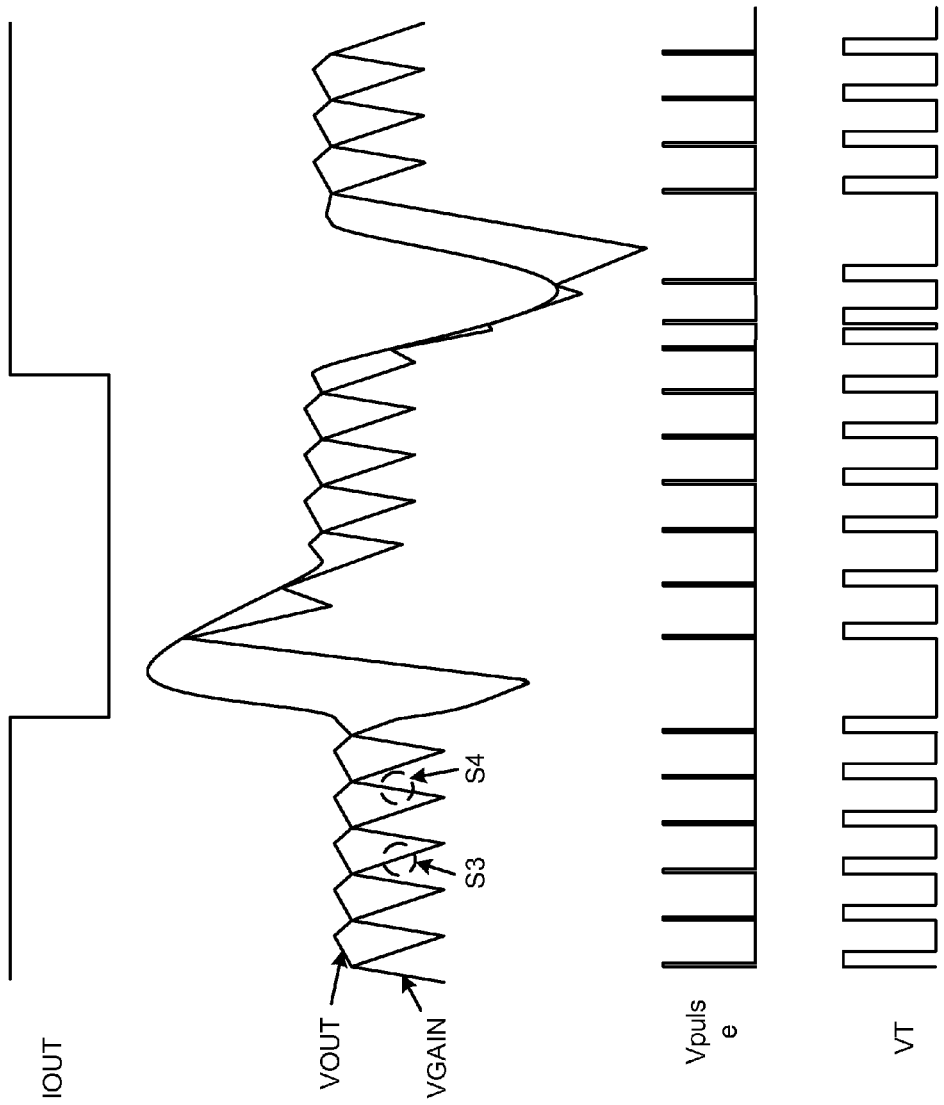
FIG. 6 illustrates an operational waveform diagram of converter circuit 50 according to one embodiment of the present invention.

FIG. 6 illustrates an operational waveform diagram of converter circuit 50 according to one embodiment of the present invention. Seen in FIG. 6, when converter circuit is operating in steady state, with the ramp component generated by the capacitor Cc2, the gain signal is:

$$VGAIN \approx \frac{R3+R4}{R3}VEAO - \frac{R4}{R3}VOUT - R4Cc2\frac{dVOUT}{dt} \quad (5)$$
$$= -\frac{R4}{R3}VOUT - R4Cc2\frac{IL}{COUT}$$

Wherein, $$-R4Cc2\frac{IOUT}{COUT}$$

is the ramp component of gain signal VGAIN, and $$-\frac{R4}{R3}VOUT$$

is defined as a steady component of gain signal VGAIN. IL is the inductor current of converter circuit 50. According to formula (5), the amplitude of the ramp component of the gain signal VGAIN is proportional to the inductor current IL with a factor of $$-\frac{R4Cc2}{COUT}.$$

By properly setting the value of R4, Cc2 and COUT, a large amplitude ramp component (e.g. 80 mV) may be applied on gain signal VGAIN. Meanwhile, compared with the output voltage VOUT, the ramp component of gain signal VGAIN is small enough to be ignored. Consequently, the gain signal VGAIN may still be considered proportional to the output voltage VOUT, which allows the gain signal VGAIN continuously being sensitive to the change on output voltage VOUT.

During the off time of converter circuit 50, the output voltage VOUT slightly declines due to its ripple, and inversely following the inductor current IL. The gain signal VGAIN rises up with a slope S4. If the gain signal VGAIN reaches the output voltage VOUT, the first comparator 206 will generate a pulse on the pulse signal Vpulse. The high side switch M1 is turned on and the low side switch M2 is turned off. The converter circuit 50 enters into on time. As the inductor current IL begins rising up, the output voltage VOUT also rises and the gain signal VGAIN declines down with a slope S3. After a constant on time TON, the high side switch M1 is turned off and the low side switch M2 is turned on. The converter circuit 50 enters into off time again.

Continuing in FIG. 6, when the load current IOUT of converter circuit 50 steps down, i.e. a load step-up happening on the converter circuit 50, the output voltage VOUT responses from the load current IOUT to rises up drastically. Meanwhile, inversely following the inductor current IL, the gain signal VGAIN initially steps up. Then, since the output voltage VOUT drastically rises up, the gain signal VGAIN proportionally declines. As a result, the difference between the output voltage VOUT and the gain signal VGAIN increases rapidly. During the off time, it takes more time for the gain signal VGAIN reaching the output voltage VOUT again. The prolonged off time of converter circuit 50 may help to quickly stop the output voltage VOUT rising up. Later, similar with the converter circuit 20, if the output voltage VOUT of converter circuit 50 declines, the gain signal VGAIN also rises up drastically, which may generate more pulses per unit time. It allows the output voltage VOUT to quickly return to the normal value.

When the load current of converter circuit 50 steps up, the output voltage VOUT on the converter circuit 50 may also stop declining and return to normal value due to the similar reason described above. Therefore, when applying a large amplitude ramp component in gain signal VGAIN, the converter circuit 50 may also obtain an excellent transient response performance by means of the short recovery time of the load step.

Figure 7:
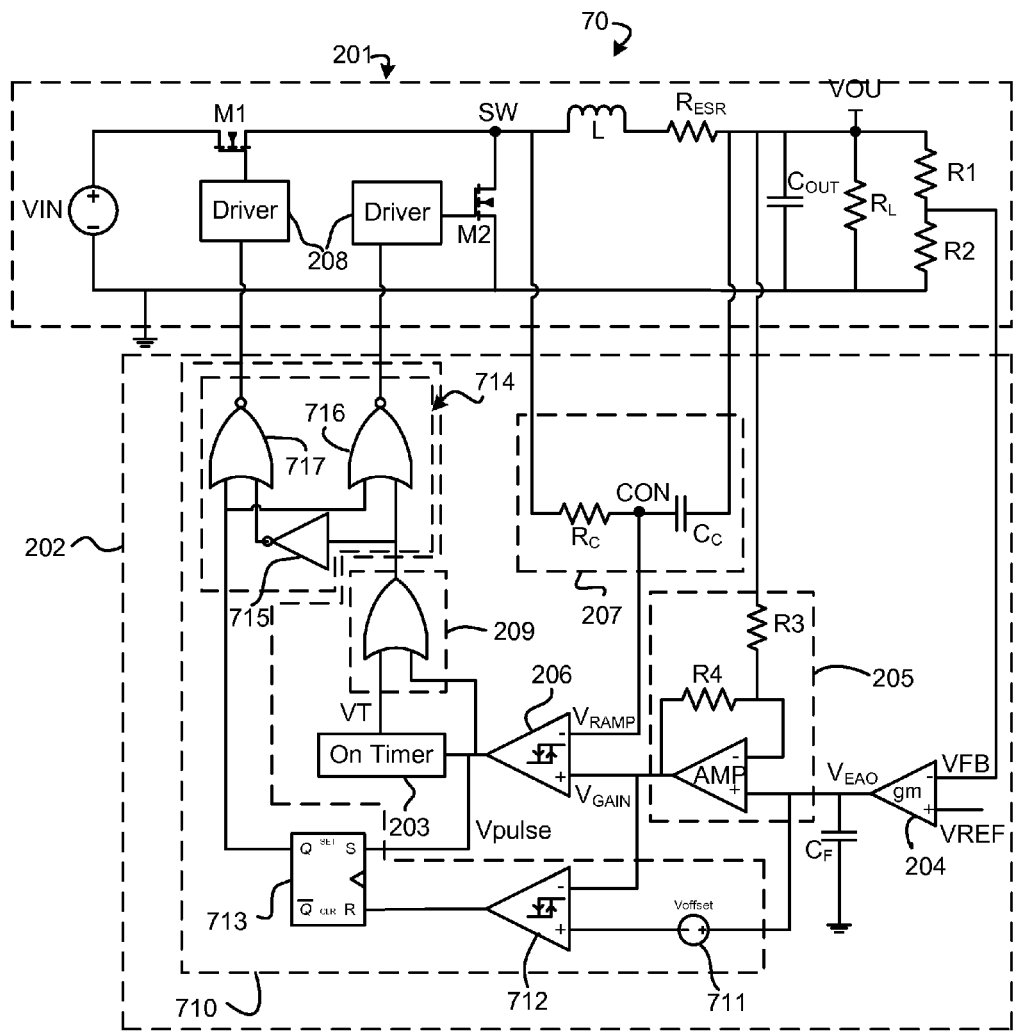
FIG. 7 illustrates a schematic circuit diagram of a converter circuit 70 according to yet another embodiment of the present invention.

FIG. 7 illustrates a schematic circuit diagram of a converter circuit 70 according to yet another embodiment of the present invention. Converter circuit 70 has elements similar to converter circuit 20 in FIG. 2. For ease of illustration, the detailed information of the similar elements will not be described.

As shown in FIG. 7, converter circuit 70 further comprises a termination circuit 710, configured to terminate the on time of converter circuit 70 when a load step-down is detected. In one embodiment, the termination circuit 710 comprises: an offset voltage source 711, having a positive end and a negative end, wherein the positive end is coupled to the positive input of proportional amplifier circuit 205; a second comparator 712, having a non-inverting input, an inverting input and an output, wherein the inverting input is coupled to the output of proportional amplifier 205, and wherein the non-inverting input is coupled to the negative end of offset voltage source 711; a flip-flop 713, having a set end, a reset end and a Q output, wherein the set end is coupled to the output of the second comparator 712, and wherein the reset end is coupled to the output of the first comparator 206, and further wherein the Q output provides a terminating signal to indicate the step-down of the load current IOUT; and a logic operation circuit 714, having two inputs and an output, wherein the logic operation circuit is coupled to the Q output of the flip-flop 713 and the output of the timer 203 respectively with its two inputs, and wherein the logic operation circuit 714 is coupled to at least the high side switch M1 with its output, and wherein the logic operation circuit 714 is configured to turn off at least the high side switch M1 in the converter circuit 201 when the terminating signal indicates a load step-down.

In one embodiment, the logic operation circuit 714 comprises: an inverter 715, having an input and an output, wherein the input is coupled to the output of the timer 203; a first NOR gate 716, having two inputs and an output, wherein the two inputs are respectively coupled to output of the inverter 715 and the Q output of the flip-flop 713, and the output is configured to generate a high side gate signal HSG to control the high side switch M1 through the driver circuit 208.

In one embodiment, a low side switch M2 is applied in voltage converter 201. The logic operation circuit 714 further comprises a second NOR gate 717, having two inputs and an output, wherein the two inputs are respectively coupled to the output of the time 203 and the Q output of the flip-flop 713, and the output is configured to generate a low side gate signal LSG to control the low side gate M2 through the driver circuit 208.

The offset voltage source 711 generates an offset voltage Voffset. When the converter circuit is operating normally, the voltage level on the non-inverting input of the second comparator 712 is VEAO-Voffset, which is always lower than the gain signal VGAIN at normal status. Thus the second comparator 712 continuously provides a low level output to the set end of the flip-flop 713, and the voltage level on output Q of the flip-flop 713 is maintained at low level. The high side gate signal HSG and the low side gate signal LSW (if applied) then depend on the timing signal VT, or further on the pulse signal Vpulse. The converter circuit 70 shares the same operation principle with the convert circuit 20 at this occasion.

When a step-down occurs on the load current IOUT, the output voltage VOUT of converter circuit 70 is in response of this step-down and rises drastically. Following the output voltage VOUT, the gain signal VGAIN also declines down drastically. If the gain signal VGAIN touches VEAO-Voffset, the second comparator 712 generates a high level output to the set end of flip-flop 713. Then the flip-flop 713 is set and the output Q of flip-flop 713 is turned to high. Both the first NOR gate 716 and the second NOR gate 717 respond from this high level Q output of flip-flop 713, and therefore the high side gate signal HSG and the low side gate signal LSG (if applied) are turned to low. Whenever the converter circuit 70 is in on-time or off-time, it immediately enters into a "shut-time", wherein during this shut-time, both the high side switch M1 and the low side switch M2 (if applied) are turned off. At this time, if the low switch M2 is applied, the body diode of the low side switch M2 is applied as a fly-wheel diode and comprises a current loop together with the inductor L and the output capacitor COUT.

During the on-time of converter circuit 70, when the load current step-down occurs, the on-time ends immediately to prohibit the rising of the output voltage VOUT since the high side switch M1 is turned off. Meanwhile as described above, the low side switch M2 is also turned off, the body diode of the low side switch M2 serves as a fly-wheel diode. With a relatively large on-state resistance, the voltage level on the conjunction SW of switches M1 and M2 is lower than normal, which speeds up the ramp down of the inductor current IL during the shut time of the converter circuit 70. Therefore, the step-down transient response speed of converter circuit 70 may be further improved.

Figure 8:
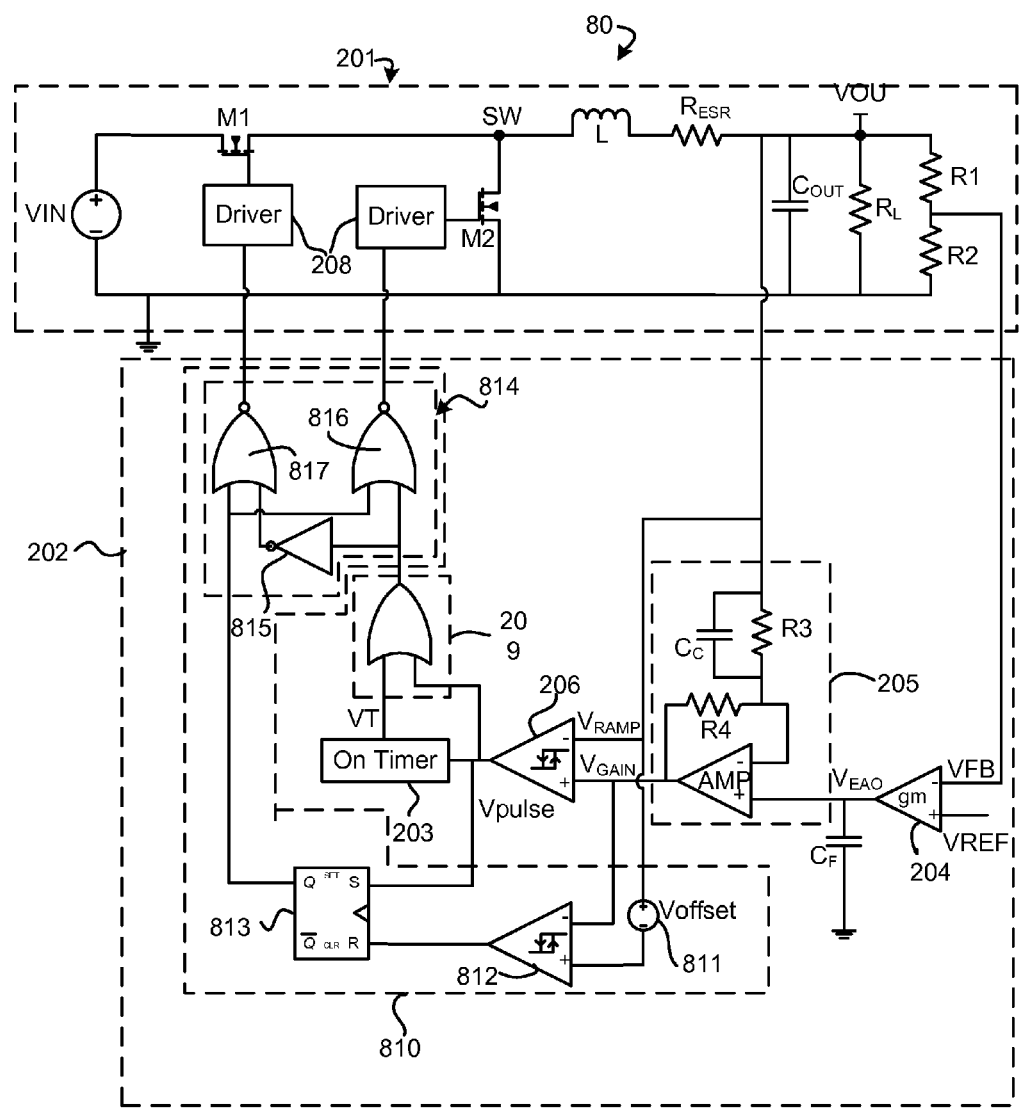
FIG. 8 illustrates a schematic circuitry diagram of a converter circuit 80 according to yet another embodiment of the present invention.

FIG. 8 illustrates a schematic circuitry diagram of a converter circuit 80 according to yet another embodiment of the present invention. Converter circuit 80 has elements similar to converter circuit 50 in FIG. 5. For ease of illustration, the detailed information of the similar elements will not be described.

Compared with converter circuit 50, converter circuit 80 further comprises a termination circuit 810, configured to make converter circuit 80 enter into a shut time when a load step-down is detected. In one embodiment, the termination circuit 810 comprises: an offset voltage source 811, having a positive end and a negative end, wherein the positive end is coupled to the output voltage VOUT; a second comparator 812, having a non-inverting input, an inverting input and an output, wherein the inverting input is coupled to the output of proportional amplifier 205, and wherein the non-inverting input is coupled to the negative end of offset voltage source 811; a flip-flop 813, having a set end, a reset end and a Q output, wherein the set end is coupled to the output of the second comparator 812, and wherein the reset end is coupled to the output of the first comparator 206, and further wherein the Q output provides a terminating signal to indicate the step-down of the load current IOUT; and a logic operation circuit 814, receiving the terminating signal and the control signal VG, operable to turn the high side switch M1 and the low side switch M2 (if applied) off when the terminating signal indicates a step-down of the load current IOUT.

In one embodiment, the logic operation circuit 814 comprises: an inverter 815, having an input and an output, wherein the input is coupled to the output of the timer 203; a first NOR gate 816, having two inputs and an output, wherein the two inputs are respectively coupled to output of the inverter 815 and the Q output of the flip-flop 813, and the output is configured to generate a high side gate signal HSG to control the high side switch M1 through the driver circuit 208.

In one embodiment, a low side switch M2 is applied in voltage converter 201. The logic operation circuit 814 further comprises a second NOR gate 817, having two inputs and an output, wherein the two inputs are respectively coupled to the output of the timer 203 and the Q output of the flip-flop 813, and the output is configured to generate a low side gate signal LSG to control the low side gate M2 through the driver circuit 208.

One with ordinary skill in relevant art may understand that the above described embodiment is illustrative without limitation. In other embodiments, other well-known circuit structures or their combinations may also be implemented into the logic operation circuit 814 to achieve similar function.

The offset voltage source 811 generates an offset voltage Voffset. When the converter circuit 80 is operating normally, the voltage level on the non-inverting input of the second comparator 812 is VOUT-Voffset, which is always lower than the ramp bottom of the gain signal VGAIN at normal. Thus the second comparator 812 continuously provides a low level output to the set end of the flip-flop 813, and the voltage level on output Q of the flip-flop 813 is maintained at low level. The high side gate signal HSG and the low side gate signal LSG (if applied) then totally depend on the timing signal VT, and the pulse signal Vpulse (if applied). The converter circuit 80 shares the same operation principle with the convert circuit 50 at this occasion.

When a step-down occurs on the load current IOUT, the output voltage VOUT of converter circuit 80 is in response of this step-down and rises drastically, which makes VOUT-Voffset also rise drastically. And following the output voltage VOUT, the gain signal VGAIN also declines down drastically. The level difference between VGAIN and VOUT-Voffset is thus greatly narrowed. If the gain signal VGAIN touches VOUT-Voffset, the second comparator 812 generates a high level output to the set end of flip-flop 813. Then the flip-flop 813 is set and the output Q of flip-flop 813 is turned to high. Both the first NOR gate 816 and the second NOR gate 817 respond from this high level Q output of flip-flop 813, and therefore the high side gate signal HSG and the low side gate signal LSG (if applied) are turned low respectively, whenever the converter circuit 80 is in on-time or off-time, it immediately enters into the shut-time, wherein during this shut-time, both the high side switch M1 and the low side switch M2 (if applied) are turned off. As this time, if the low side switch M2 is applied in switch-mode voltage converter 201, the body diode of the low side switch M2 is applied as a fly-wheel diode and comprises a current loop together with the inductor L and the output capacitor COUT.

With the same reason the converter circuit 70 as described above, since both the high side switch M1 and the low side switch M2 are turned off, the step-down transient response of converter circuit 80 may be further improved.

Figure 9:
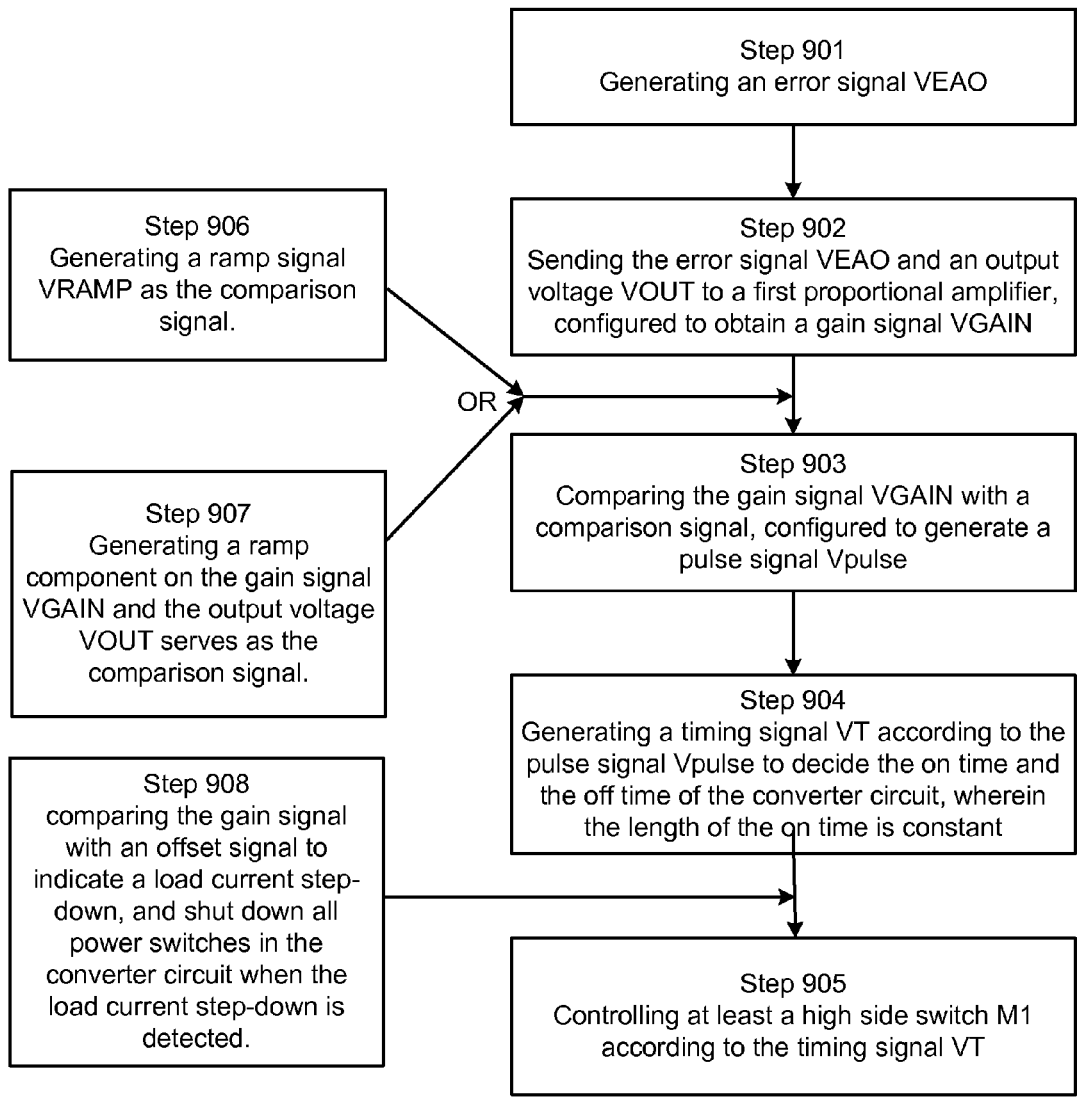
FIG. 9 illustrates a process flow of a method for controlling a converter circuit according to one embodiment of the present invention.

FIG. 9 illustrates a process flow of a method for controlling a converter circuit according to one embodiment of the present invention. Seen in FIG. 9, the method comprises: step 901, generating an error signal VEAO according to a feedback signal and a reference signal; step 902, sending the error signal VEAO and an output voltage VOUT to a first proportional amplifier, configured to obtain a gain signal VGAIN; step 903, comparing the gain signal VGAIN with a comparison signal, configured to generate a pulse signal Vpulse; step 904, generating a time signal VT according to the pulse signal Vpulse to decide the on time and the off time of the converter circuit, wherein the length of the on time is constant; wherein, either of the gain signal VGAIN or the comparison signal comprises a ramp component.

In certain embodiments, the method for controlling the converter circuit may further comprise a step 905, controlling at least a high side switch M1 according to the time signal VT.

In another embodiment, controlling at least a primary switch M1 is further according to the pulse signal Vpulse.

In certain embodiments, the method for controlling the converter circuit may further comprise a step 906 of generating a ramp signal VRAMP as the comparison signal. The ramp signal VRAMP may be generated by a ramp network. In one embodiment, the amplitude of the ramp signal VRAMP may depends on the output voltage VOUT and an input voltage VIN of the converter circuit. In other embodiments, the amplitude of the ramp signal VRAMP may depends on the output voltage VOUT solely; or the output voltage VOUT may be divided first.

In another embodiment, the method for controlling the converter circuit may alternatively further comprise a step 907 instead of the step 906. The step 907 comprises:

generating the ramp component on the gain signal VGAIN. Wherein the output voltage VOUT serves as the comparison signal.

In yet another embodiment, the method for controlling the converter circuit may further comprise an optional step 908. Step 908 comprises: comparing the gain signal with an offset signal to indicate a load current step-down, and shut down all power switches in the converter circuit when the load current step-down is detected.

In one embodiment, the step 905 may further comprise controlling a low side switch M2 in the converter circuit on and off according to the timing signal and the pulse signal (if applied). And the step 908 may further comprise shutting down the low side switch M2 in the converter circuit when a load current step-down is detected.

In one embodiment, the offset signal is the sum of the error signal and a negative offset voltage. In another embodiment, the offset signal is the sum of the output voltage and a negative offset voltage.

The above description and discussion about specific embodiments of the present invention is for purposes of illustration. However, one with ordinary skill in the relevant art should know that the invention is not limited by the specific examples disclosed herein. Variations and modifications can be made on the apparatus, methods and technical design described above. Accordingly, the invention should be viewed as limited solely by the scope and spirit of the appended claims.

We claim:

1. A switch-mode converter circuit for converting an input voltage to an output voltage, the converter circuit comprising:
    a primary switch;
    an error amplifier, having two inputs and an output, wherein the two inputs respectively receive a feedback signal of the output voltage and a reference signal, and wherein the output generates an error signal;
    a proportional amplifier, having two inputs and an output, wherein the two inputs respectively receive the output voltage and the error signal, and wherein the output generates a gain signal, wherein the gain signal proportionally declines in response to an increase of the output voltage;
    a first comparator, having two inputs and an output, wherein the two inputs respectively receive the gain signal and a comparison signal, and wherein the output generates a pulse signal; and
    a timer, having an input and an output, wherein the input is coupled to the output of the first comparator, and wherein the output generates a timing signal to indicate an on time and an off time of the primary switch;
    wherein either the gain signal or the comparison signal comprises a ramp component, wherein the ramp component at least depends on the output voltage, and wherein the on time is constant.

2. The converter circuit according to claim 1, further comprising an output inductor and an output capacitor.

3. The converter circuit according to claim 2, further comprises a ramp network, wherein the ramp network is coupled with the output inductor of the converter circuit in parallel, and wherein the ramp network is configured to generate a ramp signal serving as the comparison signal.

4. The converter circuit according to claim 3, the ramp network comprising a resistor and a capacitor, wherein the resistor and the capacitor are coupled in series, and wherein the ramp signal is generated on a conjunction node of the resistor and the capacitor.

5. The converter circuit according to claim 2, wherein the proportional amplifier comprises:
    an operation amplifier, having a first input end, a second input end and an output end, wherein the first input end is coupled to the output end of the error amplifier, and wherein the output end is coupled to the first comparator;
    a first resistor, coupled between the output voltage of the converter circuit and the second input end of the operation amplifier; and
    a second resistor, coupled to between the second input end of the operation amplifier and the output end of the operation amplifier.

6. The converter circuit according to claim 5, wherein the proportional amplifier further comprises a capacitor, wherein the capacitor is coupled in parallel with the first resistor, and wherein the comparison signal is the output voltage of the converter circuit.

7. The converter circuit according to claim 2, further comprises an OR gate, wherein the OR gate has two inputs and an output, and wherein the two inputs respectively receive the timing signal and the pulse signal, and wherein the output is coupled to and control at least the primary switch.

8. The converter circuit according to claim 1, further comprising a termination circuit, configured to terminate the on time of the primary switch when a load stepping down is detected, wherein the termination circuit comprises:
    an offset voltage source, having a positive end and a negative end, wherein the positive end is coupled to the output of the error amplifier;
    a second comparator, having a non-inverting input, an inverting input and an output, wherein the inverting input is coupled to the output of the proportional amplifier, and wherein the non-inverting input is coupled to the negative end of the offset voltage source;
    a flip-flop, having a set end, a reset end and a Q output, wherein the set end is coupled to the output of the second comparator, and wherein the reset end is coupled to the output of the first comparator, and further wherein the Q output provides a terminating signal to indicate a step-down of the load current; and
    a logic operation circuit, having two inputs and an output, wherein the two inputs are coupled to the Q output of the flip-flop and the output of the timer respectively, and wherein the output is coupled to the primary switch, and wherein the logic operation circuit is configured to turn off the primary switch when the terminating signal indicates the load step-down.

9. The converter circuit according to claim 8, wherein the logic operation circuit comprises:
    an inverter, having an input and an output, wherein the input is coupled to the output of the timer; and
    a first NOR gate, having two inputs and an output, wherein the two inputs are respectively coupled to output of the inverter and the Q output of the flip-flop, and the output is configured to generate a high side gate signal to control the primary switch.

10. The converter circuit according to claim 9, further comprising a low side switch, wherein the logic operation circuit further comprises a second NOR gate, the second NOR gate having two inputs and an output, wherein the two inputs are respectively coupled to the output of the timer and the Q output of the flip-flop, and the output is configured to generate a low side gate signal to control the low side switch.

11. The converter circuit according to claim 1, further comprising a termination circuit, configured to terminate the on time of the primary switch when a load stepping down is detected, wherein the termination circuit comprises:
- an offset voltage source, having a positive end and a negative end, wherein the positive end is coupled to the output voltage of the converter circuit;
- a second comparator, having a non-inverting input, an inverting input and an output, wherein the inverting input is coupled to the output of the proportional amplifier, and wherein the non-inverting input is coupled to the negative end of the offset voltage source;
- a flip-flop, having a set end, a reset end and a Q output, wherein the set end is coupled to the output of the second comparator, and wherein the reset end is coupled to the output of the first comparator, and further wherein the Q output provides a terminating signal to indicate a step-down of the load current; and
- a logic operation circuit, having two inputs and an output, wherein the two inputs are coupled to the Q output of the flip-flop and the output of the timer respectively, and wherein the output is coupled to the primary switch, and wherein the logic operation circuit is configured to turn off the primary switch when the terminating signal indicates the load step-down.

12. The converter circuit according to claim 11, wherein the logic operation circuit comprises:
- an inverter, having an input and an output, wherein the input is coupled to the output of the timer; and
- a first NOR gate, having two inputs and an output, wherein the two inputs are respectively coupled to output of the inverter and the Q output of the flip-flop, and the output is configured to generate a high side gate signal to control the primary switch.

13. The converter circuit according to claim 12, further comprising a low side switch, wherein the logic operation circuit further comprises a second NOR gate, the second NOR gate having two inputs and an output, wherein the two inputs are respectively coupled to the output of the timer and the Q output of the flip-flop, and the output is configured to generate a low side gate signal to control the low side switch.

14. A method for converting an input voltage to an output voltage via a converter circuit, comprising:
- generating an error signal according to a feedback signal and a reference signal;
- sending the error signal and the output voltage to a first proportional amplifier, configured to obtain a gain signal, wherein the gain signal proportionally declines in response to an increase of the output voltage;
- comparing the gain signal with a comparison signal, configured to generate a pulse signal;
- generating a timing signal to indicate an on time and an off time of a converter circuit according to the pulse signal; and
- controlling at least a primary switch in the converter circuit on and off according to the timing signal;
- wherein either of the gain signal or the comparison signal comprises a ramp component, wherein the ramp component at least depends on the output voltage, and wherein the on time of the converter is constant.

15. The method according to claim 14, wherein controlling at least the primary switch is further according to the pulse signal.

16. The method according to claim 14, further comprising generating a ramp signal serving as the comparison signal, wherein the ramp signal is generated by a ramp network.

17. The method according to claim 16, wherein the amplitude of the ramp signal further depends on the input voltage.

18. The method according to claim 14, further comprising generating a ramp component on the gain signal, and wherein the output voltage serves as the comparison signal.

19. The method according to claim 14, further comprising:
- comparing the gain signal with an offset signal to indicate a load current step-down; and
- shutting down the primary switch when a load current step-down is detected.

20. The method according to claim 19, further comprising:
- controlling a low side switch in the converter circuit on and off according to the timing signal; and
- shutting down the low side switch in the converter circuit when a load current step-down is detected.

21. The method according to claim 19, wherein the offset signal is the sum of the error signal and a negative offset voltage.

22. The method according to claim 19, wherein the offset signal is the sum of the output voltage and a negative offset voltage.

* * * * *